J. F. McGRANE.
NON-REFILLABLE BOTTLE.
APPLICATION FILED OCT. 7, 1909.
970,384.
Patented Sept. 13, 1910.
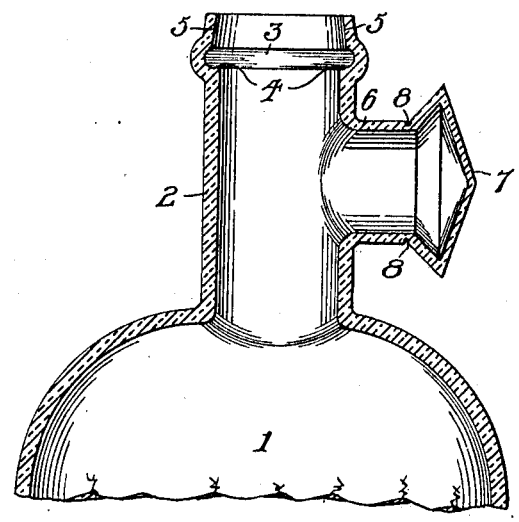
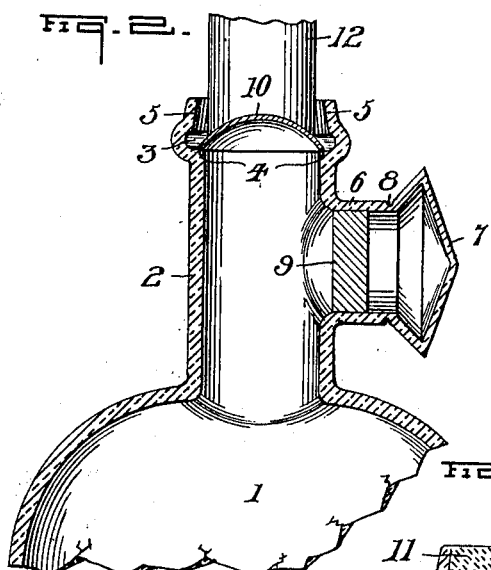
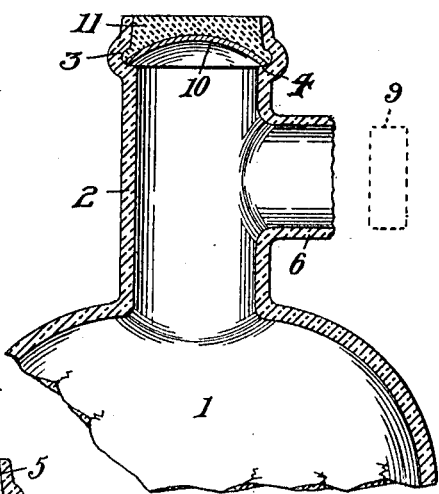
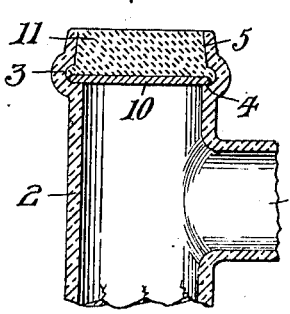
WITNESSES:
INVENTOR
John F. McGrane
By H. W. Stevenson
ATTORNEY

UNITED STATES PATENT OFFICE.

JOHN F. McGRANE, OF PITTSBURG, PENNSYLVANIA, ASSIGNOR OF ONE-HALF TO JOHN M. MORIN, OF PITTSBURG, PENNSYLVANIA.

NON-REFILLABLE BOTTLE.

970,384.      Specification of Letters Patent.     Patented Sept. 13, 1910.

Application filed October 7, 1909. Serial No. 521,534.

*To all whom it may concern:*

Be it known that I, JOHN F. McGRANE, citizen of the United States, residing at Pittsburg, in the county of Allegheny and State of Pennsylvania, have invented certain new and useful Improvements in Non-Refillable Bottles, of which the following is a specification.

My invention pertains to certain new and useful improvements in bottles, and other like receptacles of the non-refillable class. I am aware that articles of a somewhat similar nature and intention have been patented, but the fundamental principle of my invention I believe to be new, which is to produce a bottle that necessitates breakage of a portion thereof before the contents can be poured therefrom, and which will consequently not be refillable in its original shape.

Having in view the above objects my invention consists of the novel construction and arrangement of parts shown in the accompanying drawing, the right however being reserved to make all necessary alterations and amendments in the detail form of construction that will conform in all particulars to the original idea and intention.

Referring to the drawings: Figure 1 is a vertical section of the neck and upper portion of a bottle, prior to filling, with stoppers removed. Fig. 2 is a similar view, after being filled, with stoppers in place. Fig. 3 is a similar view, after being broken, with contents removed, and Fig. 4 is a fragment of a bottle neck showing a modified means for positioning a locking cap member.

Throughout the drawings the numeral 1 designates the body or receptacle portion of a bottle, the size or configuration of which is immaterial to my invention. The bottle is supplied with the usual neck 2 of predetermined size, shape, and capacity, in the upper and inner portion of which is formed a circular concavity or groove 3, the lower edge forming a ledge or shoulder 4, and the upper edge uniting with a tapered surface 5, which preferably continues upward to the extreme mouth of said neck.

In communication with the neck passage 2, and branching off at approximately right angles therewith, is a passage-way or extension member 6 of adequate size, the outer end of which is closed by a preferably flared out portion 7 the same having oppositely opposed and angularly disposed faces, as shown. The exact shape of this said portion 7 is immaterial, the one here shown being merely thought best for all practical purposes of manufacture and operativeness. This said portion 7 is formed as an integral part of the extension 6, and at the point of intersection, which is preferably made somewhat thinner in cross section, there is provided a groove 8; the utility of which will be more particularly described farther on.

After the bottle has been formed in the mold, and prior to the filling thereof, the passage-way 6 is filled with a suitable removable cork or stopper 9, which serves to prevent any of the bottle's contents from entering said passage-way, at the same time permits of the neck 2 being filled above that point of intersection if necessary, and is also of utility when the said contents are about to be removed. Subsequently to the filling of the bottle a suitable cap member 10 is inserted into the mouth of the neck 2 where it becomes seated on the ledge 4, after which a suitable sealing substance 11, preferably a cement preparation, is introduced on top of said cap. I prefer to have the said cap constructed in a concavo-convex formation, and of a material that will have more or less elasticity in order that when inserted in the neck of the bottle it can be forced, or sprung, by a suitable tool 12, until it seats firmly in the groove 3, or it may be of a flat formation, as shown in Fig. 4.

The downward flaring portion 5 of the neck will allow for said cap's easy insertion, but will likewise act to prevent or retard any removal of said cap after it has once been placed in position. The upper or convex face of the cap will furthermore serve as a hindrance to the insertion of a tool for the attempted removal of said cap, which can only be gotten at after displacing part or all of the cement or sealing material covering said member. When said sealing material is inserted on top of said cap it will enter the groove 3, and firmly embed itself around the edge of said cap, thus forming a locking feature to guard against forced removal of the said sealing material. The bottle being filled, and all the respective parts in position as heretofore described, in order to remove said contents it becomes necessary to first break off the portion 7, and draw out the stopper 9. In breaking off the said member the groove 8 will cause a comparatively even edge at the parting point, and thus avoid a ragged edge which would naturally result should there be no pre-arranged groove.

From this description it will readily be seen that it will be practically impossible to remove the contents of the bottle any other way than by breaking off the member 7 and then removing the stopper 9, as the guard or cap 10, and locked cement covering therefor, will preclude any tampering at that point without breaking the neck of the bottle, and consequently after the bottle has been thus marred it cannot be refilled in the original shape, and any attempt to utilize said bottle after it has once been emptied would be easily and quickly detected by the trade.

What I claim and desire to secure by Letters Patent, is:—

A bottle involving an extension passage-way communicating with the neck portion, the outer extremity of which terminates in an integrally formed and flared element adapted to be broken off prior to the bottle's contents being removed; a circumferential groove at the parting point between said element and extension; a stopper for said extension passage-way; a flexible cap member adapted to enter the neck and be forced into its seat in a groove formed interiorly of the neck above the extension, the mouth of said neck above the groove tapering inwardly; and a sealing substance positioned in the neck above the cap; substantially as described and shown.

In testimony whereof I affix my signature in presence of two witnesses.

JOHN F. McGRANE.

Witnesses:
BEATRICE FITZGERALD,
H. W. STEVENSON.